United States Patent [19]
Lee

[11] Patent Number: 5,690,472
[45] Date of Patent: Nov. 25, 1997

[54] INTERNAL COOLING OF TURBINE AIRFOIL WALL USING MESH COOLING HOLE ARRANGEMENT

[75] Inventor: Ching-Pang Lee, Cincinnati, Ohio

[73] Assignee: General Electric Company, Cincinnati, Ohio

[21] Appl. No.: 830,145

[22] Filed: Feb. 3, 1992

[51] Int. Cl.$^6$ ........................................ F01D 5/18
[52] U.S. Cl. .................. 416/97 R; 416/95; 415/115
[58] Field of Search ........................... 415/115, 116; 416/95, 96 R, 97 R

[56] References Cited

U.S. PATENT DOCUMENTS

| | | | |
|---|---|---|---|
| 3,191,908 | 6/1965 | Powell et al. | 416/96 R |
| 3,527,543 | 9/1970 | Howald | 416/96 |
| 3,616,125 | 10/1971 | Bowling | 416/97 R |
| 3,688,833 | 9/1972 | Bykov et al. | 416/97 R |
| 3,819,295 | 6/1974 | Hauser et al. | 416/97 |
| 3,934,322 | 1/1976 | Hauser et al. | 29/156.8 H |
| 4,118,146 | 10/1978 | Dierberger | 415/115 |
| 4,221,539 | 9/1980 | Corrigan | 416/97 A |
| 4,297,077 | 10/1981 | Durgin et al. | 416/97 R |
| 4,407,632 | 10/1983 | Liang | 415/115 |
| 4,752,186 | 6/1988 | Liang | 416/97 R |
| 5,062,768 | 11/1991 | Marriage | 416/97 R |

FOREIGN PATENT DOCUMENTS

| | | | |
|---|---|---|---|
| 243324 | 11/1969 | U.S.S.R. | 416/96 R |
| 779590 | 11/1980 | U.S.S.R. | 416/97 R |
| 872705 | 7/1961 | United Kingdom | 416/96 R |
| 1257041 | 12/1971 | United Kingdom | 416/96 R |

*Primary Examiner*—Michael J. Carone
*Assistant Examiner*—Christopher K. Montgomery
*Attorney, Agent, or Firm*—Andrew C. Hess; Patrick R. Scanlon

[57] ABSTRACT

A turbine airfoil has a mesh cooling hole arrangement which includes first and second pluralities of cooling holes formed within the interior structure of the side walls of the airfoil so as to extend between and along but not intersect spaced internal and external surfaces of the side walls extending between leading and trailing edge portions of the airfoil. The cooling holes of each plurality extend generally parallel to one another. The cooling holes of the first and second pluralities intersect so as to define a plurality of spaced apart internal solid nodes in the side walls having pairs of opposite sides interconnected by pairs of opposite corners. The spaced nodes define a multiplicity of hole portions of the cooling holes extending between and along opposite sides of adjacent nodes and a plurality of flow intersections interconnecting the hole portions of the cooling holes and being disposed between the corners of adjacent nodes. The sides of the nodes have lengths which are greater than the widths of the hole portions between adjacent nodes such that when cooling fluid is passed through the cooling holes jet flow actions are created through the hole portions which in turn generate jet interactions at the flow intersections. The jet interactions restrict air flow and produce a pressure drop which creates turbulences in the air flow that enhance convective heat transfer between the airfoil side walls and the cooling air.

10 Claims, 2 Drawing Sheets ated to the assignee of the present invention:

INTERNAL COOLING OF TURBINE AIRFOIL WALL USING MESH COOLING HOLE ARRANGEMENT

CROSS REFERENCE TO RELATED APPLICATIONS

Reference is hereby made to the following U.S. patent applications dealing with related subject matter and assigned to the assignee of the present invention:

(1) "Turbine Blade Airfoil With Serial Impingement Cooling Through Internal Cavity-Forming Ribs" by Ching P. Lee et al, assigned U.S. Ser. No. 07/578,164 and filed Sep. 6, 1990, now abandoned.

(2) "Cooling Hole Arrangement In Jet Engine Components Exposed To Hot Gas Flow" by Ching P. Lee et al, assigned U.S. Ser. No. 07/801,136 and filed Dec. 2, 1991, now U.S. Pat. No. 5,326,224.

(3) "Film Cooling Of Turbine Airfoil Wall Using Mesh Cooling Hole Arrangement" by Ching P. Lee, assigned U.S. Ser. No. 07/830,144 and filed Dec. 3, 1992, now U.S. Pat. No. 5,370,499.

BACKGROUND OF THE INVENTION

1. Field of the Invention

The present invention relates generally to gas turbine engine and, more particularly, to a turbine airfoil having a mesh arrangement of cooling holes for internal cooling of the airfoil wall.

2. Description of the Prior Art

Gas turbine engines conventionally comprise an axial flow compressor which compresses air to the proper pressure required for supporting combustion of fuel in a combustion chamber. The combustion gases then pass to a turbine which powers the axial flow compressor. After passing through the turbine, the high energy combustion gas flow may be employed to drive a power turbine which is connected to an output shaft on which may be mounted a propeller, fan or other device. Alternatively, the high energy combustion gas flow may be utilized directly as a thrust to provide motive power, as in turbojet engines commonly used for aircraft.

It is well known that efficiency of turbine engines increases with increase in temperature of the combustion gas flow. A limiting factor in the gas flow temperature is the high temperature capability of the various turbine, stator and rotor, airfoils. As used herein, reference to a turbine airfoil includes both rotor blades and stator vanes. Various approaches to cooling the airfoils have been proposed to increase the upper operating temperature capability of the engines.

One approach is "external film cooling" the airfoil which refers to the technique of cooling the external surface of the airfoil by injecting a relatively cooled air along the external surface which moves sufficiently slow so that the layer acts as an insulative layer to reduce unwanted heating of the external surface of the airfoil by the adjacent hot gas flow stream. The film cooling is produced by exhausting pressurized cooling air from an internal chamber through cooling holes in the airfoil wall to the exterior surface of the airfoil. Examples of this approach are disclosed in U.S. Pat. No. 3,527,543 to Howald and U.S. Pat. No. 4,221,539 to Corrigan.

Another approach is "internal impingement cooling" the airfoil which refers to the technique of cooling internal surfaces of the airfoil by exhausting high pressure cooling air through apertures formed in inserts or internal cavity-forming ribs to form jets of air that strike the interior surfaces of the airfoil wall. Examples of this approach are disclosed in U.S. Pat. No. 4,297,077 to Durgin et al and the first patent application cross-referenced above.

Still another approach is "internal convection cooling" the airfoil which refers to the technique of cooling the interior of the airfoil by passing cooled air through cooling holes in the airfoil wall to cause convective heat transfer from the walls to the air by contact with the air flow. An example of internal convection cooling is disclosed in U.S. Pat. Nos. 3,819,295 and 3,934,322 to Hauser et al.

The Hauser et al patents disclose an internal convection cooling in a trailing edge portion of an airfoil. A cooling slot is formed by first and second pluralities of parallel holes formed through the trailing edge portion of the airfoil from an internal chamber of the airfoil to the exterior of the trailing edge portion. The pluralities of holes intersect one another so as to define spaced apart internal solid nodes in the airfoil trailing edge portion. The intersections of the pluralities of holes are areas of flow intersection. The length of the solid nodes in the cooling slot of Hauser et al is equal to or smaller than the width of the hole portions between the nodes. When cooling air is passed through the cooling slot of the trailing edge portion of the airfoil, the nodes act as turbulence promoters and area increasers for improving convective heat transfer between the airfoil and the cooling air. Also, the nodes positioned at the inlets and the outlets of the cooling holes of Hauser et al patent are of the same size so that the inlet area of the cooling holes is the same as the outlet area thereof. In his construction, Hauser tried to simulate the pin-fin bank commonly employed on prior art airfoils wherein the trailing edge outlet holes were formed by an open slot with a plurality of spaced apart transverse pins.

Although the approach of the cited Hauser et al patents is a step in the right direction for providing internal convective cooling of airfoils to increase the operating temperature and thereby the efficiency of the turbine engines, a need for additional improvement of internal convective cooling of airfoils still remains.

SUMMARY OF THE INVENTION

The present invention provides an internal mesh cooling hole arrangement in a turbine airfoil which is designed to satisfy the aforementioned need. Like the cooling holes in the cooling slot of the Hauser et al patents, the cooling holes in the mesh arrangement of the present invention include first and second pluralities of holes which intersect one another so as to define spaced apart internal solid nodes with the intersections of the pluralities of holes being areas of flow intersection.

However, unlike in the Hauser et al patents, the cooling holes in the mesh arrangement of the present invention are formed within the interior structure of the side walls of the airfoil so as to extend between and along but not intersect the spaced internal and external surfaces thereof between the leading and trailing edge portions of the airfoil. Also, the length of the solid nodes defined by the cooling holes in the mesh arrangement of the present invention is larger than the width of the hole portions between the nodes.

Because of these differences between the cooling holes in the mesh arrangement of the present invention and the cooling holes in the cooling slot of the Hauser et al patents, a larger heat transfer area is provided and a jet flow action in the hole portions between the nodes is produced which generates jet interactions at the flow intersections between the holes that restrict air flow and produce pressure drop and thereby create turbulences which promote convective heat transfer between the airfoil and the cooling air. Thus, when cooled air is passed through the mesh arrangement of cooling holes in the interior of the airfoil side wall between the spaced internal and external surfaces thereof, increased turbulent flows and enhanced heat transfer coefficients are attained.

Accordingly, the present invention is set forth in a turbine blade airfoil having leading and trailing edge portions and opposite side walls defining pressure and suction sides and extending between and merging together and with the leading and trailing edge portions. The side walls have internal surfaces defining a hollow interior chamber for communication of cooling air flow to the side walls. The side walls also have external surfaces spaced from the internal surfaces and extending generally in the direction of gas flow past the airfoil from the leading edge portion to the trailing edge portion of the airfoil. The side walls further have respective interior structure defined between the internal and external surfaces thereof.

The present invention is directed to a mesh cooling hole arrangement which comprises first and second pluralities of cooling holes formed within the interior structure of the side wall at least at said pressure side of the airfoil so as to extend between and along but not intersect the spaced internal and external surfaces of the side wall extending between leading and trailing edge portions of the airfoil. The cooling holes of each plurality extend generally parallel to one another. The cooling holes of the first and second pluralities have flow inlets defined at the merger of the side wall with the leading edge portion and flow outlets defined at the merger of the side wall with the trailing edge portion of the airfoil.

The cooling holes of the first and second pluralities intersect so as to define a plurality of spaced apart internal solid nodes in the side wall having pairs of opposite sides interconnected by pairs of opposite corners. The spaced nodes define a multiplicity of hole portions of the cooling holes which extend between and along opposite sides of adjacent nodes and a plurality of flow intersections which interconnect the hole portions of the cooling holes and are disposed between the corners of adjacent nodes. The sides of the nodes have lengths which are greater than the widths of the hole portions between adjacent nodes such that, when cooling fluid is passed through the cooling holes, jet flow actions are created through the hole portions which in turn generate jet interactions at the flow intersections. The jet interactions restrict air flow and produce a pressure drop which creates turbulences in the air flow that enhance convective heat transfer between the airfoil side wall and the cooling air.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
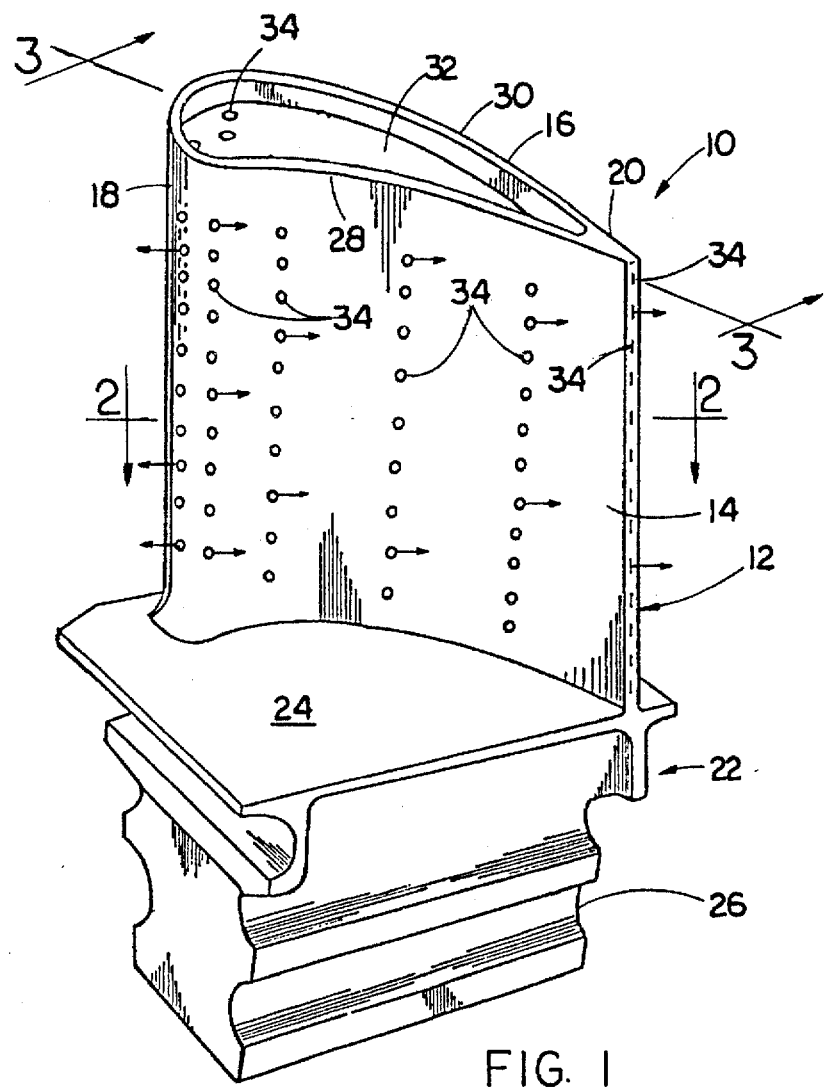
FIG. 1 is a perspective view of a prior art turbine engine blade having film cooling holes in the blade airfoil wall for exit of cooling air therefrom.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Prior Art Turbine Engine Blade

Figure 2:
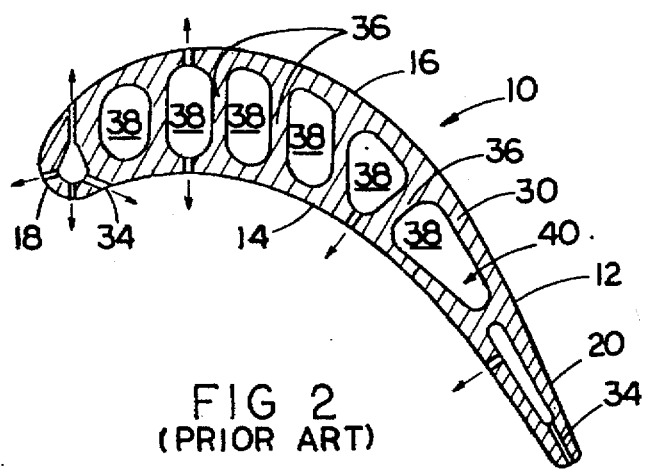
FIG. 2 is an enlarged cross-sectional view of the prior art blade airfoil taken along line 2—2 of FIG. 1.
Figure 3:
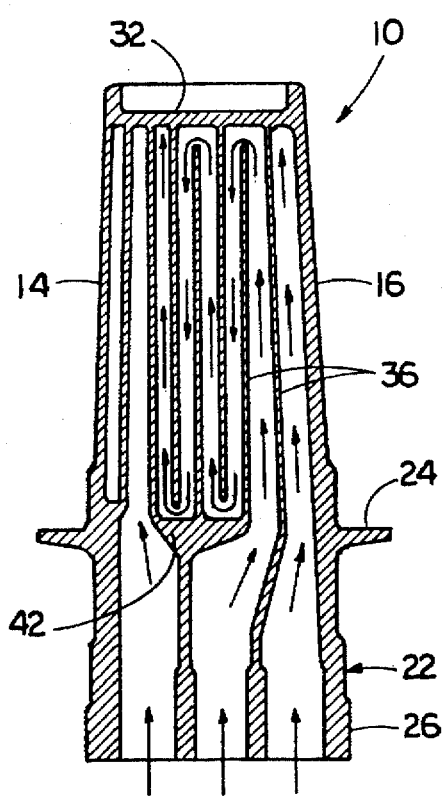
FIG. 3 is an enlarged longitudinal sectional view of the prior art blade taken along line 3—3 of FIG. 1.

Referring now to the drawings, and particularly to FIGS. 1–3, there is illustrated a prior art gas turbine engine hollow blade, generally designated 10. The hollow blade 10 includes an airfoil 12 having pressure and suction sides 14, 16 and leading and trailing edges 18, 20, and a base 22 mounting the airfoil 12 to a rotor (not shown) of the engine (not shown). The base 22 has a platform 24 rigidly mounting the airfoil 12 and a dovetail root 26 for attaching the blade 10 to the rotor.

The airfoil 12 has opposite side walls 28, 30 defining the pressure and suction sides 14, 16 of the airfoil 12 which extend between and merge together with the leading and trailing edge portions 18, 20 of the airfoil 12 and are rigidly attached upright on the platform 24. The airfoil 12 also has an end cap 32 which closes the outer ends of the side walls 28, 30. The side walls 28, 30, leading and trailing edges 18, 20 and end cap 32 of the airfoil 12 contain small cooling apertures or holes 34 which permit passage and exit of cooling air from the interior of the blade airfoil 12.

Cooling air flows into and upwardly through the base 22 of the blade 10 to the airfoil 12. The airfoil 12 includes a plurality of interior spaced ribs or transverse walls 36 which extend across the hollow interior of the airfoil 12 and rigidly interconnected with the opposite side walls 28, 30 so as to define a series of interior cavities 38 in the airfoil 12 in a hollow interior chamber 40 of the airfoil. As seen in FIG. 3, the ribs 36 extend vertically and alternately connect to and terminate short of the end cap 32 at their upper ends and of a solid portion 42 of the base 22. In such fashion, the ribs 36 define serpentine arrangements of cavities and passages within the interior of the airfoil 12 causing cooling air to flow along internal serpentine paths, as illustrated in FIG. 3, and exit through the holes 34 in the side walls 28, 30, leading and trailing edges 18, 20 and end cap 32 of the airfoil 12.

Mesh Cooling Hole Arrangement of Present Invention

Figure 4:
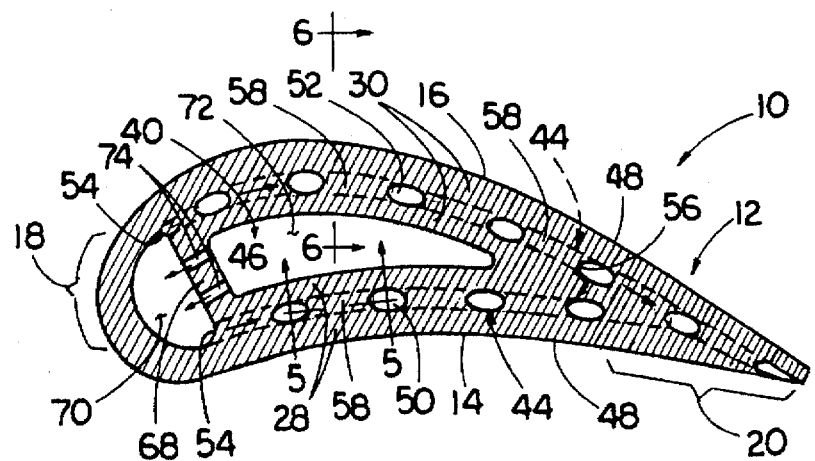
FIG. 4 is a view similar to FIG. 2 but now illustrating a mesh cooling hole arrangement formed in the interior of the blade airfoil wall in accordance with the present invention.
Figure 5:
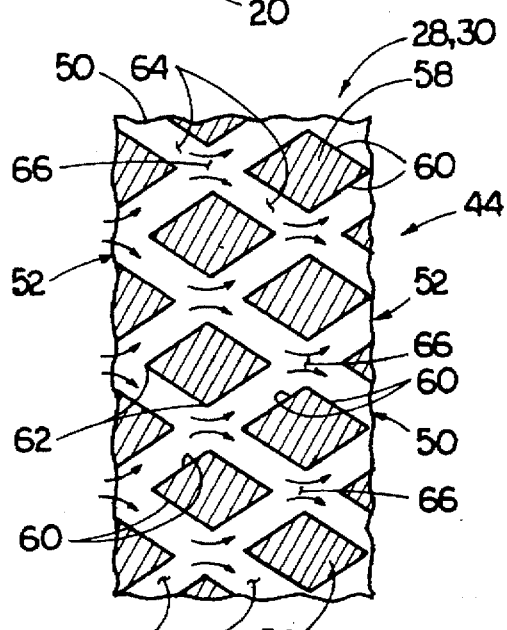
FIG. 5 is an enlarged fragmentary longitudinal sectional view of the mesh cooling hole arrangement taken along line 5—5 of FIG. 4.
Figure 6:
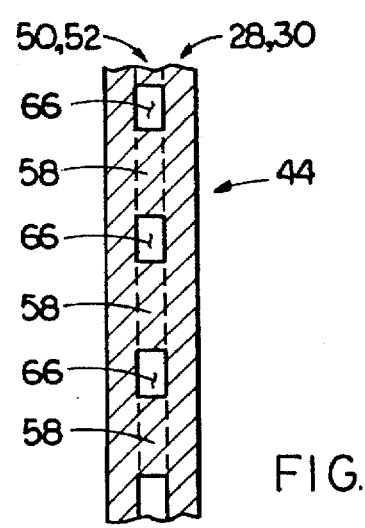
FIG. 6 is an enlarged fragmentary longitudinal sectional view of the mesh cooling hole arrangement taken along line 6—6 of FIG. 4.

Referring to FIGS. 4–6, in accordance with the present invention, a mesh cooling hole arrangement, generally designated 44, is provided in the interior structure of at least the pressure side wall 28 and, preferably, in the interior structures of both pressure and suction side walls 28, 30 of the airfoil 12 being defined between spaced internal and external surfaces 46, 48 of the side walls 28, 30. The internal surfaces 46 define the hollow interior chamber 40 which provides the interior flow of cooling air within the airfoil 12 for communication to the side walls 28, 30. The external surfaces 48 of the side walls 28, 30 of the airfoil 12 extend generally in the direction of gas flow past the airfoil from the leading edge portion 18 to the trailing edge portion 20 of the airfoil.

The mesh cooling hole arrangement 44 in each side wall 28, 30 includes first and second pluralities of cooling holes 50, 52 formed within the interior structure of the respective side wall 28, 30 so as to extend between and along but not intersect with the spaced internal and external surfaces 46, 48 of the side wall 28, 30 extending between the leading and trailing edge portions 18, 20 of the airfoil 12. Preferably, the cooling holes 50, 52 are of circular cross-section, however, they can be of any other cross-sectional configuration, such as rectangular, square, oval, etc. The cooling holes 50, 52 of each plurality extend generally parallel to one another and are substantially straight. Also, the cooling holes 50, 52 of the first and second pluralities have flow inlets 54 defined at the merger of the side walls 28, 30 together and with the leading edge portion 18 of the airfoil 12, and flow outlets 56 defined at the merger of the side walls 28, 30 together and with the trailing edge portion 20 of the airfoil 12. The cooling holes 50, 52 of the mesh arrangement are suitable for use in both large and small airfoils and can be cast as an integral part of the airfoil.

Further, the cooling holes 50, 52 of the first and second pluralities intersect so as to define a plurality of spaced apart internal solid diamond-shaped nodes 58 in each of the side walls 28, 30 having pairs of opposite sides 60 interconnected by pairs of opposite corners 62. Also, the spaced nodes 58 define a multiplicity of hole portions 64 of the cooling holes 50, 52 which extend between and along the sides 60 of adjacent nodes 58 and a plurality of flow intersections 66 which interconnect the hole portions 64 of the cooling holes 50, 52 and are disposed between the corners 62 of adjacent nodes 58. The sides 60 of the nodes 58 have lengths which are greater than the widths of the hole portions 64 between the adjacent node sides 60 such that, when cooling fluid or air is passed through the cooling holes 50, 52, jet flow actions are created through the hole portions 64 between the sides 60 which, in turn, generate jet interactions at the flow intersections 66 between the corners 62 of adjacent nodes 58. The jet interactions at the flow intersections 66 restrict air flow and produce a pressure drop which creates turbulences in the air flow through the cooling holes 50, 52 that enhance convective heat transfer between the airfoil side walls 28, 30 and the cooling air.

Also, the airfoil 12 has at least one interior transverse wall 68 extending between and connected with the opposite side walls 28, 30 adjacent to and spaced from the leading edge portion 18 of the airfoil 12. The interior transverse wall 68 defines a forward interior cavity 70 and a central interior cavity 72 in the interior chamber 40. The forward interior cavity 70 is in flow communication with the flow inlets 54 of the cooling holes 50, 52 of the first and second pluralities of the mesh cooling hole arrangement 44. The interior transverse wall 68 includes orifices 74 for providing communication of air flow from the central interior cavity 72 to the forward interior cavity 70 where the air flow splits into two streams, one for flow through the cooling hole inlets 54 in the pressure side wall 28 and the other for flow through the cooling hole inlets 54 in the suction side wall 30. The cooling air then flows axially through the cooling holes 50, 52 of the mesh arrangement 44, eventually exiting through the trailing edge portion 20 of the airfoil 12.

The leading end portion 18 of the airfoil 12 may also have the cooling holes 34 of the configuration shown in FIG. 1. The mesh cooling hole arrangement 44 can also extend from the flow outlets 56 of the side walls 28, 30 through the trailing edge portion 20 to the exterior thereof.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

I claim:

1. In a turbine blade airfoil having leading and trailing edge portions and opposite side walls defining pressure and suction sides and extending between and merging together with said leading and trailing edge portions, said side walls having internal surfaces defining a hollow interior chamber for communication of cooling air flow to said side walls, said side walls having external surfaces spaced from said internal surfaces and extending generally in the direction of gas flow past said airfoil from said leading edge portion to said trailing edge portion of said airfoil, each of said side walls having an interior structure defined between said internal and external surfaces thereof, a mesh cooling hole arrangement comprising:

(a) first and second pluralities of cooling holes formed within said interior structure of said side wall at least at said pressure side of said airfoil so as to extend between and along but not intersect with said spaced internal and external surfaces of said side wall extending between said leading and trailing edge portions of said airfoil;

(b) said cooling holes of said first plurality and said cooling holes of said second plurality having inlets and outlets disposed such that the cooling flow direction within said cooling holes is in a generally axial direction from said leading edge portion to said trailing edge portion of said airfoil; and (c) said cooling holes of said first plurality intersecting said cooling holes of said second plurality so as to define a plurality of spaced apart internal solid nodes in said side wall having pairs of opposite sides interconnected by pairs of opposite corners, a multiplicity of hole portions extending between and along opposite sides of adjacent nodes and a plurality of flow intersections interconnecting said hole portions and disposed between said corners of adjacent nodes.

2. The arrangement as recited in claim 1, wherein said sides of said internal nodes in said side wall of said airfoil have lengths greater than the widths of said hole portions between adjacent nodes such that when cooling fluid is passed through said first and second pluralities of cooling holes in said airfoil side wall a jet flow action is created in said hole portions between said sides of adjacent nodes which generates jet interactions at said flow intersections between said corners of adjacent nodes to cause restriction of air flow and produce a pressure drop, enhancing convective heat transfer between said airfoil side wall and the cooling air.

3. The arrangement as recited in claim 1, wherein said first and second pluralities of cooling holes are formed within said interior structure of said respective side walls at said pressure and suction sides of said airfoil.

4. The arrangement as recited in claim 1, wherein said cooling holes of each of said pluralities extend generally parallel to one another.

5. The arrangement as recited in claim 1, wherein said cooling holes of said first and second pluralities have flow inlets defined at the merger of said side wall with said leading edge portion and flow outlets defined at the merger of said side wall with said trailing edge portion of said airfoil.

6. The arrangement as recited in claim 5, wherein said airfoil has at least one interior transverse wall extending between and connected with said opposite side walls adjacent to and spaced from said leading edge portion of said airfoil, said interior transverse wall defining a forward interior cavity and a central interior cavity in said interior chamber, said forward interior cavity being in flow communication with said flow inlets of said cooling holes of said first and second pluralities of said mesh cooling hole arrangement.

7. The arrangement as recited in claim 6, wherein said interior transverse wall includes at least one orifice defined through said wall for providing communication from said central interior cavity to said forward interior cavity.

8. In a turbine blade airfoil having leading and trailing edge portions and opposite side walls defining pressure and suction sides and extending between and merging together with said leading and trailing edge portions, said side walls having internal surfaces defining a hollow interior chamber for communication of cooling air flow to said side walls, said side walls having external surfaces spaced from said internal surfaces and extending generally in the direction of gas flow past said airfoil from said leading edge portion to said trailing edge portion of said airfoil, each of said side walls having an interior structure defined between said internal and external surfaces thereof, a mesh cooling hole arrangement comprising:

(a) first and second pluralities of cooling holes formed within said interior structure of each of said side walls of said airfoil so as to extend between and along but not intersect with said spaced internal and external surfaces of said side walls extending between said leading and trailing edge portions of said airfoil, said cooling holes of each of said pluralities extending generally parallel to one another;

(b) said cooling holes of said first plurality and said cooling holes of said second plurality having inlets and outlets disposed such that the cooling flow direction within said cooling holes is in a generally axial direction from said leading edge portion to said trailing edge portion of said airfoil; and (c) said cooling holes of said first plurality intersecting said cooling holes of said second plurality so as to define a plurality of spaced apart internal solid nodes in said side walls having pairs of opposite sides interconnected by pairs of opposite corners, a multiplicity of hole portions extending between and along opposite sides of adjacent nodes and a plurality of flow intersections interconnecting said hole portions and disposed between said corners of adjacent nodes;

(c) said sides of said internal nodes in said side walls of said airfoil having lengths greater than the widths of said hole portions between adjacent nodes such that when cooling fluid is passed through said first and second pluralities of cooling holes in said airfoil side walls a jet flow action is created in said hole portions between said sides of adjacent nodes which generates jet interactions at said flow intersections between said corners of adjacent nodes to cause restriction of air flow and produce a pressure drop, enhancing convective heat transfer between said airfoil side walls and the cooling air.

9. The arrangement as recited in claim 8, wherein said cooling holes of said first and second pluralities have flow inlets defined at the merger of said side walls with said leading edge portion and flow outlets defined at the merger of said side walls with said trailing edge portion of said airfoil.

10. The arrangement as recited in claim 9, wherein said airfoil has at least one interior transverse wall extending between and connected with said opposite side walls adjacent to and spaced from said leading edge portion of said airfoil, said interior transverse wall defining a forward interior cavity and a central interior cavity in said interior chamber, said forward interior cavity being in flow communication with said flow inlets of said cooling holes of said first and second pluralities of said mesh cooling hole arrangement.

* * * * *